(12) United States Patent
Chasser

(10) Patent No.: US 8,445,781 B1
(45) Date of Patent: May 21, 2013

(54) ELECTRICAL RECEPTACLE COVER HAVING SAFETY BRACKET FOR USE WITH FRAGRANCE DISPENSER

(76) Inventor: Nova D. Chasser, Warren, OH (US)

( * ) Notice: Subject to any disclaimer, the term of this patent is extended or adjusted under 35 U.S.C. 154(b) by 48 days.

(21) Appl. No.: 13/296,275

(22) Filed: Nov. 15, 2011

(51) Int. Cl.
*H02G 3/14* (2006.01)

(52) U.S. Cl.
USPC ............... 174/67; 174/66; 439/135; 220/242

(58) Field of Classification Search
USPC ............... 174/66, 67; 220/242; 439/135, 136
See application file for complete search history.

(56) References Cited

U.S. PATENT DOCUMENTS

| | | | |
|---|---|---|---|
| D261,135 S | 10/1981 | Horne | |
| 4,851,612 A | * 7/1989 | Peckham | 174/67 |
| 5,045,640 A | * 9/1991 | Riceman | 174/67 |
| 5,195,901 A | * 3/1993 | Correnti | 439/147 |
| 6,031,183 A | 2/2000 | Guerrieri | |
| 6,669,942 B2 | 12/2003 | Perricaudet et al. | |
| 6,780,031 B1 | 8/2004 | Valls | |
| 7,094,969 B1 | 8/2006 | In | |
| 7,338,309 B2 | 3/2008 | Gremillion et al. | |

* cited by examiner

*Primary Examiner* — Dhirubhai R Patel
(74) *Attorney, Agent, or Firm* — Kyle Fletcher

(57) ABSTRACT

The electrical receptacle cover having safety bracket for use with fragrance dispenser is an improved electrical receptacle cover that can secure an object plugged into an electrical outlet via a removable safety bracket. The removable safety bracket attaches at distal ends to lock slots located on the surface of the cover, and from which the safety bracket extends outwardly in order to encircle at least a portion of a perimeter of an object plugged into a respective outlet. The electrical receptacle cover and safety bracket prevent unintended unplugging of the object with respect to the electrical outlet thereby minimizing danger posed to small and curious children.

7 Claims, 3 Drawing Sheets

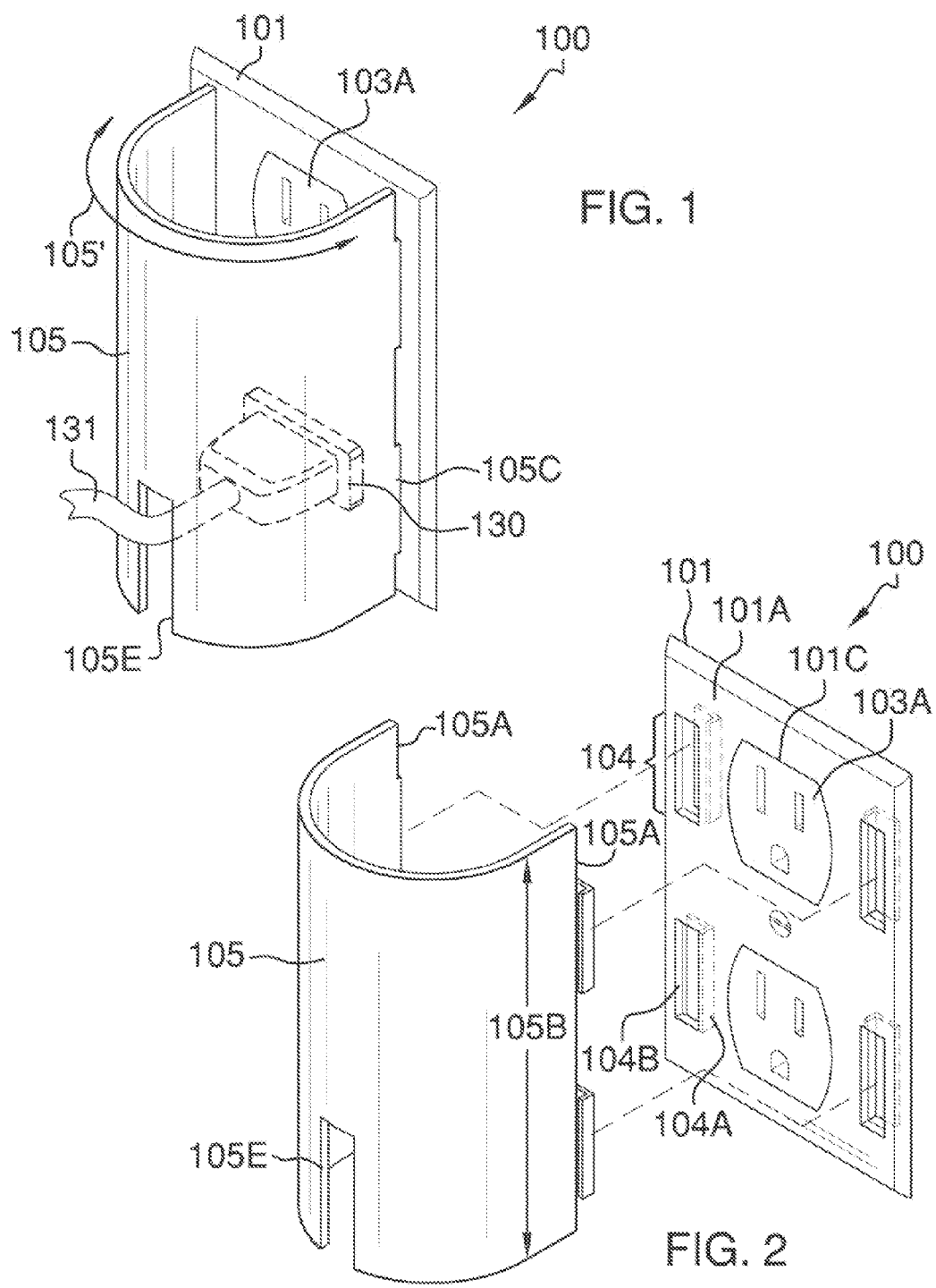

ELECTRICAL RECEPTACLE COVER HAVING SAFETY BRACKET FOR USE WITH FRAGRANCE DISPENSER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical receptacle covers, more specifically, a cover that includes a safety bracket for securing a fragrance dispenser to the respective electrical receptacle.

Fragrance dispensers come in all shapes, sizes, and types. A common type of a fragrance dispenser is one in which the dispenser has an electrical plug for use with an electrical outlet. The electrical plug fragrance dispensers operate a heating element to consume an endothermically-operative fragrance that is stored somewhere on the dispenser. The shortcomings of said fragrance dispensers is that they rely on the electrical outlet to stay in place, and may simply fall out of the socket where the electrical outlet is old and warn out. Moreover, a small child might be inclined to pull out the fragrance dispenser thereby giving said child an opportunity to play with a potentially deadly electrical receptacle. What is needed is an electrical outlet cover that includes a safety bracket integrated into the design of the cover, and which shall secure a fragrance dispenser or like-sized object to said electrical outlet and cover thereby minimizing safety hazards to unattended children.

The device of the present application seeks to address the safety issues that arise with a fragrance dispenser that plugs into an electrical outlet.

B. Discussion of the Prior Art

As a preliminary note, it should be stated that there is an ample amount of prior art that deals with electrical receptacle covers, generally. However, no prior art discloses an electrical receptacle cover that is particularly suited in securing an item to said cover and to the respective electrical outlet for which said item is plugged therein; wherein the electrical receptacle cover includes a safety bracket that extends outwardly from the surface of the cover in order to encircle at least a portion of the item being plugged therein; wherein the safety bracket is ideally suited for securing a fragrance dispenser that is plugged into a respective electrical outlet; wherein the safety bracket includes distal ends specifically suited for securement to lock slots integrated into the surface of the electrical receptacle cover.

The In Patent (U.S. Pat. No. 7,094,969) discloses an electrical outlet safety cover having a sliding cover plate. However, the electrical outlet safety cover is adaptive to concealing the electrical outlet when not in use, and not particularly suited for securing a fragrance dispenser plugged into said outlet when in use.

The McIlvenna Patent (U.S. Pat. No. 6,669,492) discloses a child safety cover for an electrical outlet comprising a cover adapted to slide vertically within slide channels. However, the child safety cover is not specifically suited for securing a fragrance dispenser plugged into an outlet by providing a safety bracket that extends from the cover and encircles all or a portion of the fragrance dispenser.

The Gremillion et al. Patent (U.S. Pat. No. 7,338,309) discloses a locking outlet cover designed to protect electrical outlets from children. However, the locking outlet cover is not suited to securing to said cover plate, a fragrance dispenser plugged into a respective outlet via a safety bracket extending from said cover plate and enclosing at least a small portion of the fragrance dispenser to both the oulet and cover.

The Valls Patent (U.S. Pat. No. 6,780,031) discloses a child-proof safety plate assembly. Again, the safety plate assembly is incapable of securing a fragrance dispenser to an electrical outlet by extending a safety bracket there from.

The Guerrieri Patent (U.S. Pat. No. 6,031,183) discloses an electrical outlet cover that is slidably received on the base plate. However, the electrical outlet cover is directed to closing off access to the electrical outlet, and not securing an item that is plugged into an electrical outlet, much less a fragrance dispenser plugged into said electrical outlet.

The Horne Patent (U.S. Pat. No. Des. 261,135) illustrates a design of a safety cover for electrical outlets, which does not depict a safety bracket extending outwardly from the cover in order to secure an object plugged into one of the electical outlets.

While the above-described devices fulfill their respective and particular objects and requirements, they do not describe an electrical receptacle cover that is particularly suited in securing an item to said cover and to the respective electrical outlet for which said item is plugged therein; wherein the electrical receptacle cover includes a safety bracket that extends outwardly from the surface of the cover in order to encircle at least a portion of the item being plugged therein; wherein the safety bracket is ideally suited for securing a fragrance dispenser that is plugged into a respective electrical outlet; wherein the safety bracket includes distal ends specifically suited for securement to lock slots integrated into the surface of the electrical receptacle cover. In this regard, the electrical receptacle cover having safety bracket for use with fragrance dispenser departs from the conventional concepts and designs of the prior art.

SUMMARY OF THE INVENTION

The electrical receptacle cover having safety bracket for use with fragrance dispenser is an improved electrical receptacle cover that can secure an object plugged into an electrical outlet via a removable safety bracket. The removable safety bracket attaches at distal ends to lock slots located on the surface of the cover, and from which the safety bracket extends outwardly in order to encircle at least a portion of a perimeter of an object plugged into a respective outlet. The electrical receptacle cover and safety bracket prevent unintended unplugging of the object with respect to the electrical outlet thereby minimizing danger posed to small and curious children.

An object of the invention is to provide an electrical receptacle cover that secures objects to the electrical outlets thereby preventing unwanted unplugging therefrom so as to prevent small children access to an open electrical outlet.

A further object of the invention is to provide a safety bracket that attaches to and detaches from lock slots located on the surface of the cover, and from which said safety bracket extends outwardly and encircles at least a portion of the object plugged therein to the respective electrical outlet.

A further object of the invention is to provide the safety bracket with distal ends having means for engagement with the lock slots such that the safety bracket shall be squeezed inwardly, then slid through the lock slots, and thereafter un-squeezed to extend outwardly to an original shape in order to lock in place with the lock slots thereby securing the safety bracket to the electrical receptacle cover.

An even further object of the invention is to provide a safety bracket that has a semi-circular profile defined by a width that can encircle either a small portion of the object or a majority of the object plugged into the respective electrical outlet.

An even further object of the invention is to provide a safety bracket including a cord slot so as to secure an electrical plug to said electrical outlet for objects that do not necessarily stay in place adjacent to the electrical receptacle cover.

These together with additional objects, features and advantages of the electrical receptacle cover having safety bracket for use with fragrance dispenser will be readily apparent to those of ordinary skill in the art upon reading the following detailed description of presently preferred, but nonetheless illustrative, embodiments of the electrical receptacle cover having safety bracket for use with fragrance dispenser when taken in conjunction with the accompanying drawings.

In this respect, before explaining the current embodiments of the electrical receptacle cover having safety bracket for use with fragrance dispenser in detail, it is to be understood that the electrical receptacle cover having safety bracket for use with fragrance dispenser is not limited in its applications to the details of construction and arrangements of the components set forth in the following description or illustration.

Those skilled in the art will appreciate that the concept of this disclosure may be readily utilized as a basis for the design of other structures, methods, and systems for carrying out the several purposes of the electrical receptacle cover having safety bracket for use with fragrance dispenser.

It is therefore important that the claims be regarded as including such equivalent construction insofar as they do not depart from the spirit and scope of the electrical receptacle cover having safety bracket for use with fragrance dispenser. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a perspective view of the electrical receptacle cover having safety bracket installed on an electrical outlet in which the safety bracket has a length just short of the length of the receptacle cover, and featuring a plurality of slide locks on opposing sides of the receptacle cover and further including a cord slot along a bottom, edge of said safety bracket;

FIG. 2 illustrates an exploded view of the electrical receptacle cover having safety bracket in which dashed lines depict alignment and translational movement of the safety bracket with respect to the lock slots of the electrical receptacle cover;

DETAILED DESCRIPTION OF THE EMBODIMENT

Figure 3:
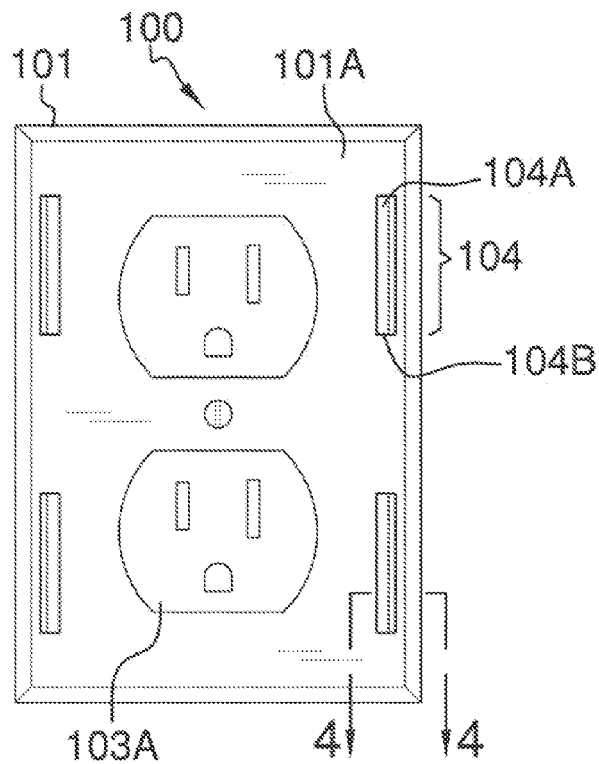
FIG. 3 illustrates a front view of the receptacle cover by itself and installed on an electrical outlet.
Figure 4:
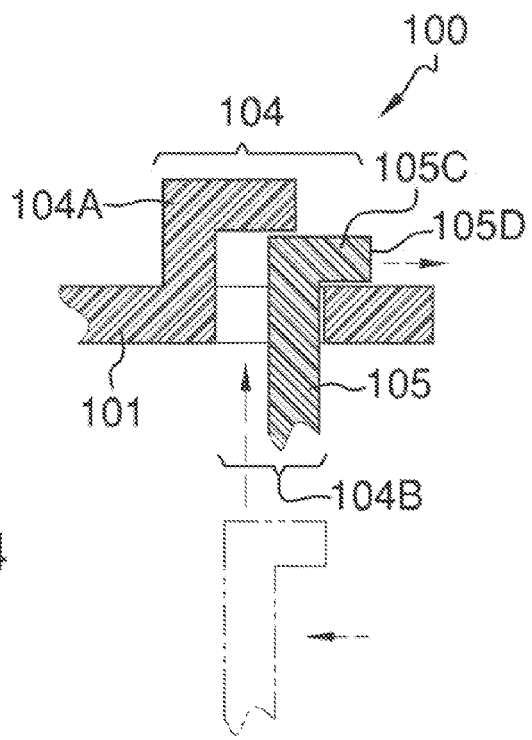
FIG. 4 illustrates a cross-sectional view of the receptacle cover along line 4-4 and detailing the means located on the distal ends of the safety bracket being squeezed inwardly (as denoted by the arrow pointing left), inserted through the lock slots (as denoted by the arrow pointing up), and un-squeezed (as denoted by the arrow pointing right) to lock in place within the lock slot so as to secure the safety bracket to the lock slot.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. An electrical receptacle cover having safety bracket for use with fragrance dispenser 100 (hereinafter invention) includes an electrical receptacle cover 101 further defined with an outer surface 101A. The electrical receptacle cover 101 works in a traditional sense in that a screw 102 is inserted through a screw hole 101B located centrally on the electrical receptacle cover 101, and the screw 102 threads into an electrical receptacle 103 located behind the electrical receptacle cover 101.

The electrical receptacle cover 101 includes two openings 101C through which electrical outlets 103A of the electrical receptacle 103 are accessed there through.

Located on the outer surface 101A of the electrical receptacle cover 101 are lock slots 104. The lock slots 104 are composed of an elbow-shaped protuberance 104A that extends inwardly from the surface of the outer surface 101A. The lock slots 104 come in pairs and the elbow-shaped protuberances 104A are directed inwardly or towards the center of the outer surface 101A or towards one another. The lock slots 104 are each further defined by a width 104B, which is used to enable insertion of clips 105C that are located on distal ends 105A of a safety bracket 105 thereto (see FIG. 4).

The safety bracket 105 attaches to the electrical receptacle cover 101 via the lock slots 104. The safety bracket 105 comes in different sizes, but accomplishes the same task, which is to encircle an object 130 plugged into the electrical outlet 103A. Moreover, the safety bracket 105 extends outwardly from the outer surface 101A, and covers a portion of the object 130 by encircling said portion of the object 130. It shall be noted that the safety bracket 105 features a semi-circular profile 105' when looking down on the safety bracket 105 as installed onto the electrical receptacle cover 101.

The safety bracket 105 is further defined by the distal ends 105A, which rest against the outer surface 101A of the receptacle cover 101. The safety bracket 105 is also defined by a width 105B, which can vary depending upon the particular application (see FIG. 1 versus FIG. 5). The width 105B is in direct relation to an amount of a portion of the object 130 to be encircled by the safety bracket 105.

Located on the distal ends 105A of the safety bracket 105 are the clips 105C, which engage the lock slots 104 of the electrical receptacle cover 101 in order to secure the safety bracket 105 thereto. The clips 105C essentially mirror the elbow-shaped protuberance 104A of the lock slot 104. The clips 105C work in conjunction with the lock slots 104 by requiring the distal ends 105A to be squeezed inwardly until the clips 105C align with the lock slots 104, upon which the clip 105C slode into the lock slots 104, and upon which the safety bracket 105 is unsequeezed such that the clips 105C stretch outwardly to their normal state, and thereby lock the safety bracket 105 to the electrical receptacle cover 101 (see FIG. 4).

Referring to FIG. 2, the safety bracket 105 aligns with and engages the lock slots 104 before insertion in order to engage the clips 105C with the elbow-shaped protuberance 104A.

Referring to FIGS. 1 and 2, the safety bracket 105 may include a cord slot 105E through which an electrical cord 131 may extend therefrom so as not to impede a more traditional use of the electrical outlet 103A.

Figure 5:
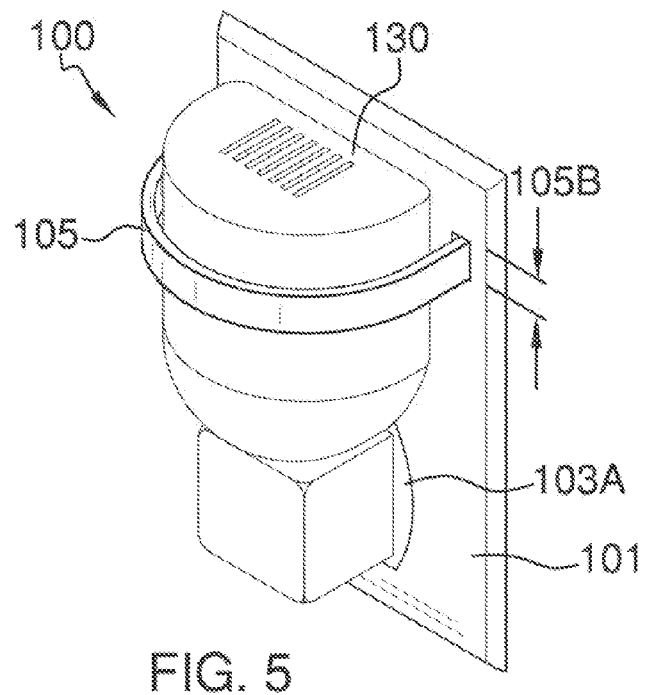
FIG. 5 illustrates a perspective view of the electrical receptacle cover having safety bracket wherein the safety bracket has a thin width and protects an object plugged into a single electrical outlet.
Figure 6:
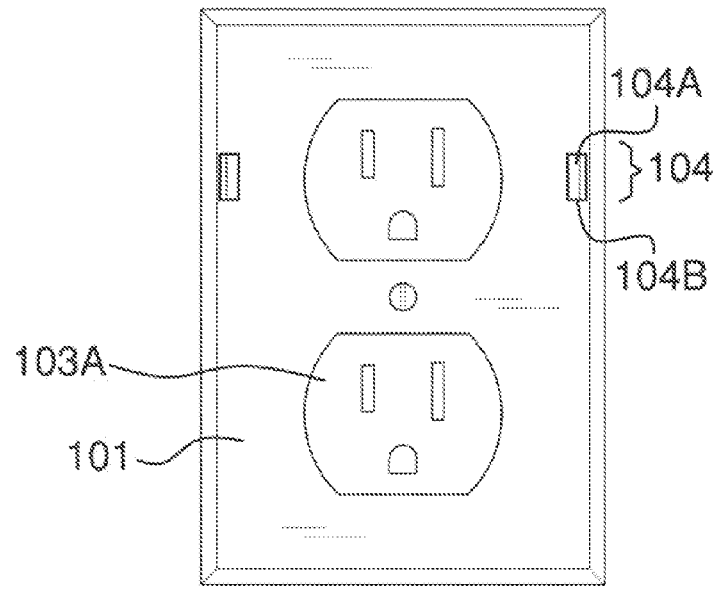
FIG. 6 illustrates a front view of the electrical receptacle cover of FIG. 5, and detailing the small lock slots used to secure the respective safety bracket thereto.

It shall be noted that the term object 130 is being used to refer to different items that plug into the electrical outlet 103A, and may comprise a plug as depicted in FIG. 1 or an outlet-mounted device as depicted in FIG. 5. More specifically, an outlet-mounted device may be an air freshener that plugs into the electrical outlet 103A, and which supports itself thereon.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electrical receptacle cover with safety bracket comprising:
    an electrical receptacle cover having a plurality of locking slots provided on an outer surface and to which a safety bracket attaches in order to encircle and secure an object plugged into an electrical outlet so associated with said electrical receptacle cover;
    wherein the lock slots are comprised of an elbow-shaped protuberance that extends inwardly from an interior surface of the electrical receptacle cover;
    wherein the lock slots come in aligned pairs such that the elbow-shaped protuberances are directed inwardly towards one another;
    wherein the safety bracket includes on distal ends clips that mirror the elbow-shaped protuberances of the lock slots; whereupon squeezing the clips inwardly in order to align the clips with the slots, and which said clips shall be inserted, and subsequently un-squeezed such that the clips stretch outwardly to their normal state, and thereby lock the safety bracket to the electrical receptacle cover;
    wherein the safety bracket includes a cord slot that enables an electrical cord to egress from within the safety bracket.

2. The electrical receptacle cover as described in claim 1 wherein the safety bracket is further defined with a semi-circular profile that extends from said distal ends.

3. The electrical receptacle cover as described in claim 1 wherein the safety bracket has a width that covers a portion of said object.

4. The electrical receptacle cover as described in claim 1 wherein the cord slot is located along a bottom, perimeter of the safety bracket.

5. An electrical receptacle cover with safety bracket comprising:
    an electrical receptacle cover having a plurality of locking slots provided on an outer surface and to which a safety bracket attaches in order to encircle and secure an object plugged into an electrical outlet so associated with said electrical receptacle cover;
    wherein the safety bracket has a width that covers a portion of said object;
    wherein the lock slots are comprised of an elbow-shaped protuberance that extends outwardly from the outer surface of the electrical receptacle cover;
    wherein the lock slots come in aligned pairs such that the elbow-shaped protuberances are directly inwardly towards one another;
    wherein the safety bracket includes on distal ends clips that mirror the elbow-shaped protuberances of the lock slots; whereupon squeezing the clips inwardly in order to align the clips with the slots, and which said clips shall be inserted, and subsequently un-squeezed such that the clips stretch outwardly to their normal state, and thereby lock the safety bracket to the electrical receptacle cover;
    wherein the safety bracket includes a cord slot that enables an electrical cord to egress from within the safety bracket.

6. The electrical receptacle cover as described in claim 5 wherein the safety bracket is further defined with a semi-circular profile that extends from said distal ends.

7. The electrical receptacle cover as described in claim 5 wherein the cord slot is located along a bottom, perimeter of the safety bracket.

* * * * *